Patented Nov. 11, 1947

2,430,455

UNITED STATES PATENT OFFICE 2,430,455

REACTION PRODUCTS OF S-BENZYL PENICILLAMINES AND G-PENALDATES AND PROCESS FOR MAKING SAME

Harry Means Crooks, Jr., Detroit, Mich., assignor to Parke, Davis & Company, Detroit, Mich., a corporation of Michigan No Drawing. Application November 20, 1944, Serial No. 564,406

8 Claims. (Cl. 260—470)

This invention relates to the preparation of intermediates useful in the synthesis of penicillin and related compounds. In my copending application Serial Number 564,404, filed November 20, 1944, the compound d,l-S-benzyl-penicillamine (I) has

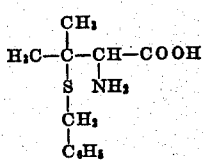

been described as an intermediate for use in the synthesis of penicillin. In copending application Serial Number 591,407, filed May 1, 1945, of Lee C. Cheney, the compound ethyl G-penaldate (II) has been described.

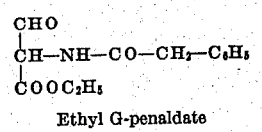

Ethyl G-penaldate

Ethyl G-penaldate may be prepared, as described in said Cheney application, by condensing ethyl phenaceturate and ethyl formate in benzene in the presence of sodium ethoxide to obtain the sodium enolate of ethyl phenylacetaminoformylacetate which upon acidification with acetic acid produces ethyl G-penaldate.

It has now been found that d,l-S-benzylpenicillamine or its lower alkyl esters, as well as the corresponding d- and l-forms of these compounds, will react with a lower alkyl ester of a penaldic acid such as G-penaldic acid to form substances of the general formula,

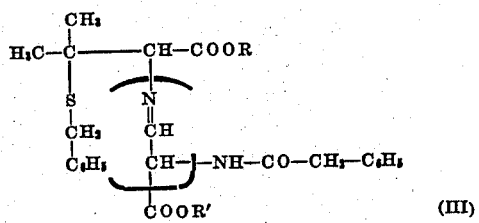

where R is a member of the class hydrogen and lower alkyl of not more than six carbon atoms, including cycloalkyls such as cyclopentyl and cyclohexyl, and R' is an alkyl radical of not more than six carbon atoms, including cycloalkyls such as cyclopentyl and cyclohexyl.

It is possible that, instead of the products having Formula III, that they have the isomeric structure IIIA, wherein the grouping which is bracketed in III as

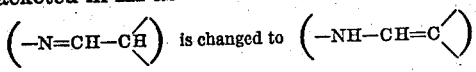

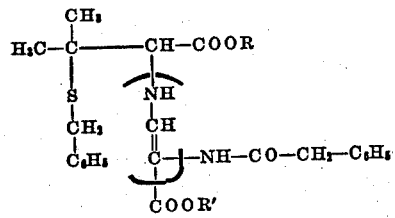

The product of reacting I, or its ester, and II, or equivalent ester, could also contain some of both III and IIIA. In all probability the main portion of the product has structure IIIA rather than III, inasmuch as there would be a strong tendency for the double bond of III to shift into a position of conjugation $\alpha,\beta$ to the carbonyl group of the penaldate ester. This is borne out by the ultraviolet absorption peak of $\epsilon=18,700$ at 2800 Å. for the reaction product. Such a strong absorption is characteristic of $\alpha,\beta$ but not $\beta$-$\gamma$-unsaturated esters.

The practice of the invention may be illustrated by the following example.

Example 1

A five gram sample of d,l-S-benzyl penicillamine, M. P. about 211°, is suspended in 500 ml. of ethanolic hydrogen chloride and dry HCl gas bubbled through the chilled (to 0° C.) suspension for 2 hours, in order to form the ethyl ester of d,l-S-benzyl penicillamine. After standing 24 hours the solution is evaporated to dryness in vacuo and the residue taken up with 300 cc. of ether, 100 cc. water and 100 cc. saturated NaHCO₃ solution. The aqueous phase is extracted with a further 100 cc. of ether and the combined ether layers washed two times with 50 cc. of ½% NaOH solution and then with water until neutral. Evaporation of the ether gives 4.1 gms. of clear yellow oil which has the correct analysis for the ethyl ester of (I), that is, the ethyl ester of S-benzyl penicillamine, C₁₄H₂₁O₂SN.

One gram of the above ethyl ester is dissolved in 25 cc. of absolute ethanol and a solution of 1 gram of ethyl G-penaldate in 25 cc. of absolute ethanol is added and finally 0.5 cc. of conc. hydrochloric acid solution. After standing 24 hours at room temperature the solution is diluted with 7 volumes of ether and washed well with water, then with sodium bicarbonate solution and finally washed again with water. Evaporation of the ether gives 1.5 gm. of a heavy yellow oil which on cooling sets to a honey-like consistency. On drying in a high vacuum the material appears as a glass which analyses as follows:

Calc'd for $C_{27}H_{34}O_5N_2S$: C, 65.0; H, 6.9
Found: C, 64.17; H, 7.15

The structural formula for the product of this example is probably as follows,

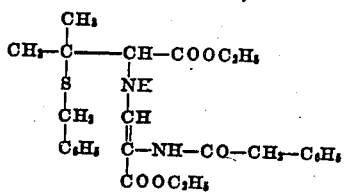

Extraction of the gum with boiling ligroin indicates the product is essentially homogeneous.

Example 2

4.9 grams of d(−)-α-amino-β-benzylthioisovaleric acid (the d-form of S-benzyl penicillamine) described in my copending application, Serial No. 564,405, filed November 20, 1944, are suspended in one half liter of cold (about 0° C.) anhydrous methanol saturated with hydrogen chloride. Dry hydrogen chloride gas is bubbled through the mixture for a few hours in order to produce the methyl ester of d-S-benzyl penicillamine. After standing for a day the solution is brought to dryness in vacuo and the residue treated with a mixture of 400 cc. of ether, 90 cc. of water and 100 cc. of saturated aqueous sodium bicarbonate solution. The ether layer is separated from the aqueous layer and the latter extracted with 100 cc. of ether and the ether extracts then combined. The combined ether extracts are washed twice with about 50 cc. portions of one-half percent sodium hydroxide solution and then with water until the washings become neutral. The ether is evaporated to give 4 grams of transparent straw-colored oil which gives the correct analysis for the methyl ester of d-S-benzyl penicillamine. Its empirical formula is $C_{13}H_{19}O_2SN$.

A gram of the methyl ester of d-S-benzyl penicillamine is dissolved in 25 cc. of absolute ethyl alcohol and a solution of 1 gram of ethyl G-penaldate in 25 cc. of absolute ethanol is added and then ½ cc. of concentrated hydrochloric acid solution. After the solution has stood at room temperature for 24 hours it is diluted with 6 or 7 volumes of ether, washed well with water, then with sodium bicarbonate solution and finally with water. Evaporation of the ether gives 1.45 grams of oil which is cooled and dried in a vacuum to a glass like material giving the correct analysis for a compound of formula, $C_{26}H_{32}O_5N_2S$. The product of this example is a di-ester of the probable formula,

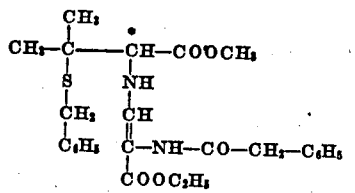

*d-Configuration at the α-carbon atom.

Example 3

5.2 gms. of free d-α-amino-β-benzylthioisovaleric acid (d-form of S-benzyl penicillamine), obtained for example as described in my copending application Serial No. 564,405, filed November 20, 1944, are dissolved in 140 cc. of absolute ethanol and a solution of 2.6 gms. of ethyl G-penaldate in 65 cc. of absolute ethanol is added and, finally, 1 cc. of conc. hydrochloric acid solution. After standing for about a day at room temperature, the solution is diluted with 7 volumes of ether and washed well with water, then with two 100 cc. portions of N/10 hydrochloric acid solution and, finally, with small portions of sodium bicarbonate solution until the washings become faintly alkaline. Upon acidification of the sodium bicarbonate washes, a precipitate of gummy crystals forms. The acidification can be carried out by means of a dilute solution of strong mineral acid, preferably a non-oxidizing non-reducing mineral acid. The crystals may be further purified by taking them up in a solvent, such as a lower aliphatic alcohol, and concentrating and cooling the solution and allowing it to stand until crystals form. The crystals are then filtered off, washed and dried. They analyze approximately the theoretical for a compound of the formula,

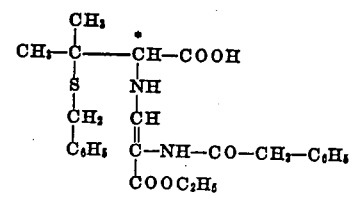

*d-Form at this carbon atom.

The examples given above are intended to illustrate the invention and not to limit its scope to the specific materials and conditions described therein. Numerous variations of the invention will occur to those skilled in the art. For example, instead of using d-S-benzyl penicillamine, one can use l-S-benzyl penicillamine or a lower alkyl ester of the same, whereby the final product is the l-form of condensate instead of the d-form. Moreover, instead of reacting the d- or the l-forms of S-benzyl penicillamine with a G-penaldic ester, one can first obtain a d,l-product by reacting d,l-S-benzyl penicillamine with an ester of a penaldic acid such as G-penaldic acid and thereafter react the free mono-ester mono-acid compound with an optically active basic substance such as quinine, brucine, strychnine or like optically active alkaloid. A mixture of salts of the alkaloid is thus formed and the two optical isomers present in the solution are separated from one another, e. g. by fractional crystallization from a solvent.

By way of illustration, the d,l-final product under Example 3 above can be put into solution in a common organic solvent along with the alkaloid and the mixture warmed to bring the reactants into solution, after which the solution is cooled and, if necessary, concentrated until crystals of the least soluble of the two isomeric forms of the alkaloid salt of the mono-ester mono-acid compound separates out. The form which first separates is filtered away from the solution and the latter (mother liquor) concentrated and cooled until the other form separates. In this way, the separate d- and l-forms are obtained as alkaloidal salts. The salts are then separately treated with basic or alkaline aqueous solution, such as ammonium hydroxide solution, or sodium or potassium hydroxide solution, to liberate the alkaloid which is extracted with an inert organic water immiscible solvent such as chloroform, after which the alkaline aqueous solution is made acidic by adding a strong non-oxidizing non-reducing mineral acid. One then extracts the free mono-ester mono-acid compound with an inert water immiscible organic solvent such as chloroform or ether. The mono-ester mono-acid solution is then concentrated and cooled until the ester-acid crystallizes out of the solvent, or all solvent is removed at low temperature, preferably under vacuum. In this manner, the separate d- and l-forms of the mono-ester mono-acid compound of the following formula (or tautomeric formula) are obtained,

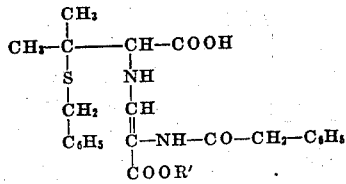

Although the examples describe use of hydrochloric acid and methyl or ethyl alcohol as a medium for condensing the amine compound with the aldehyde, any other strong non-oxidizing non-reducing mineral acid, such as sulfuric or phosphoric acid, may be used and other alcohols, preferably a lower aliphatic alcohol, can also be used. Other variations will be apparent to those skilled in the art.

What I claim is:

1. Method which comprises reacting under condensing conditions the amino group of an amino acid compound of formula,

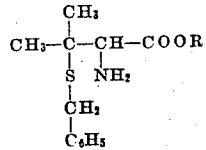

with the aldehyde group of a penaldic acid ester of formula,

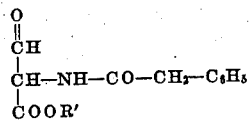

where R is a member of the class hydrogen, lower alkyl, and lower cycloalkyl radicals and R' is a member of the class lower alkyl and lower cycloalkyl radicals thereby obtaining a compound of formula:

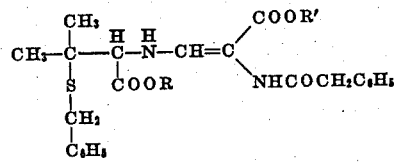

2. Method which comprises reacting an amino acid compound of formula,

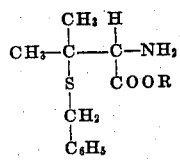

with a penaldic acid ester of formula,

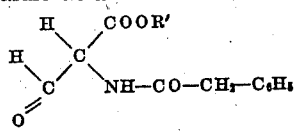

in an alcoholic solution containing a strong non-oxidizing non-reducing mineral acid to cause condensation of the amino group of the amino acid with the aldehyde group of the penaldic acid ester with elimination of water and production of a compound of formula,

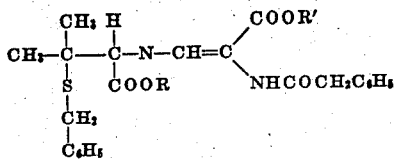

where R is a member of the class hydrogen, lower alkyl, and lower cycloalkyl radicals and R' is a member of the class lower alkyl and lower cycloalkyl radicals.

3. Method which comprises reacting an amino acid of formula,

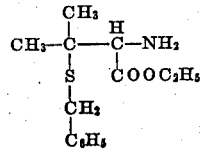

with a penaldic acid ester of formula,

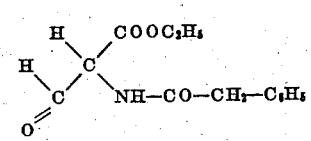

in an alcoholic solution containing a strong non-oxidizing non-reducing mineral acid to cause condensation of the amino group of the amino acid with the aldehyde group of the penaldic acid ester with elimination of water and production of a compound of formula,

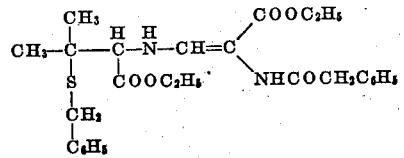

4. Method which comprises reacting the d-form of an amino acid compound of formula,

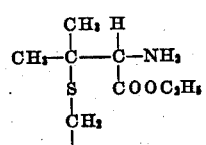

with G-penaldic acid ethyl ester of formula,

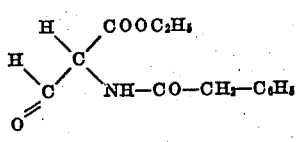

in an alcoholic solution containing hydrochloric acid to cause condensation of the amino group of the amino acid with the aldehyde group of the penaldic acid ester with elimination of water and production of a compound of formula,

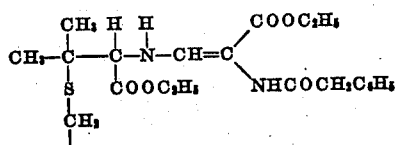

5. Method which comprises reacting the d,l-form of an amino acid compound of formula,

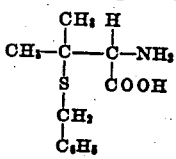

with a G-penaldic acid ester of formula,

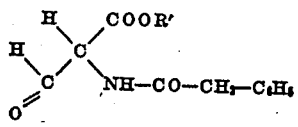

in an alcoholic solution containing a strong non-oxidizing non-reducing mineral acid to cause condensation of the amino group of the amino acid with the aldehyde group of the G-penaldic acid ester with elimination of water and production of the d,l-form of a mono-ester mono-acid compound of the formula,

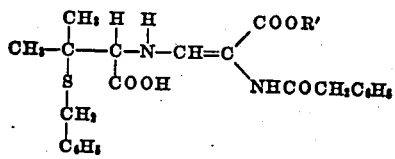

reacting the latter compound with an optically active base to form a mixture of d- and l-salts, fractionally crystallizing and separating the d- and l-salts from one another and thereafter separately treating the d- and l-salts with alkaline aqueous solution to liberate the original optically active base from the salts, extracting the optically active base with inert organic water immiscible solvent, acidifying the extracted aqueous solution with a mineral acid of said class, extracting the separate d- and l-forms of said mono-ester mono-acid from the acidified aqueous solution with an inert water immiscible organic solvent and removing solvent from the extract to obtain the separate d- and l-forms.

6. A compound of the formula,

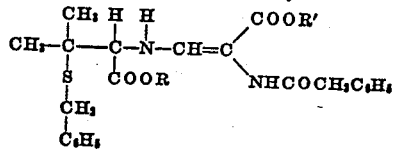

where R is a member of the class hydrogen, lower alkyl and lower cycloalkyl radicals and R' is a member of the class lower alkyl and lower cycloalkyl radicals.

7. A compound of the formula,

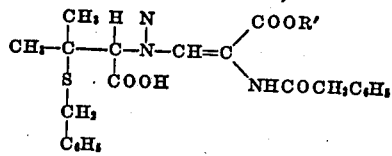

where R' is a member of the class lower alkyl and lower cycloalkyl radicals.

8. A compound of the formula,

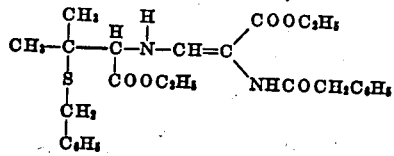

HARRY MEANS CROOKS, Jr.

REFERENCES CITED

The following references are of record in the file of this patent:

Committee Medical Research (O. S. R. D.) Report No. 5, Contract No. O. E. M. C. M. R. 408; University of Michigan, June 1, 1944, p. 5.

Squibb Inst. for Medical Research, Monthly Progress Report for May 1944 S-XIX, page 11.

(Both available in U. S. Patent Office, Div. 59.)